United States Patent
Franceschin et al.

(10) Patent No.: US 9,512,258 B2
(45) Date of Patent: Dec. 6, 2016

(54) PROCESS FOR THE PRODUCTION OF VISCOELASTIC POLYURETHANE FOAM

(71) Applicant: Bayer MaterialScience AG, Leverkusen (DE)

(72) Inventors: Andrea Franceschin, Venice (IT); Daria Trentin, Rosa (IT); Alberto Peghin, Bassano del Grappa (IT); Fabrizio Rizzato, Carre' (IT); Franz-Josef Bohne, Leichlingen (DE)

(73) Assignee: Covestro Deutschland AG, Leverkusen (DE)

( * ) Notice: Subject to any disclaimer, the term of this patent is extended or adjusted under 35 U.S.C. 154(b) by 143 days.

(21) Appl. No.: 14/405,448

(22) PCT Filed: Jun. 3, 2013

(86) PCT No.: PCT/EP2013/061398
§ 371 (c)(1),
(2) Date: Dec. 4, 2014

(87) PCT Pub. No.: WO2013/182527
PCT Pub. Date: Dec. 12, 2013

(65) Prior Publication Data
US 2015/0166713 A1 Jun. 18, 2015

(30) Foreign Application Priority Data
Jun. 6, 2012 (IT) .............................. RM2012A0259

(51) Int. Cl.
| | |
|---|---|
| C08G 18/08 | (2006.01) |
| C08G 18/48 | (2006.01) |
| C08G 18/63 | (2006.01) |
| C08G 18/10 | (2006.01) |
| C08G 18/16 | (2006.01) |
| C08G 18/76 | (2006.01) |
| C08G 101/00 | (2006.01) |

(52) U.S. Cl.
CPC ............... *C08G 18/14* (2013.01); *C08G 18/10* (2013.01); *C08G 18/168* (2013.01); *C08G 18/48* (2013.01); *C08G 18/485* (2013.01); *C08G 18/4825* (2013.01); *C08G 18/4833* (2013.01); *C08G 18/4841* (2013.01); *C08G 18/63* (2013.01); *C08G 18/632* (2013.01); *C08G 18/7671* (2013.01); *C08G 2101/00* (2013.01); *C08G 2101/0008* (2013.01); *C08G 2101/0083* (2013.01)

(58) Field of Classification Search
CPC .... C08G 18/14; C08G 18/48; C08G 18/485; C08G 18/168; C08G 18/7671; C08G 18/4833; C08G 18/63; C08G 18/632; C08G 18/10; C08G 18/4825; C08G 18/4841; C08G 2101/00; C08G 2101/0083; C08G 2101/0008

See application file for complete search history.

(56) References Cited

U.S. PATENT DOCUMENTS

| | | | |
|---|---|---|---|
| 3,620,986 | A | 11/1971 | Diehr et al. |
| 4,089,835 | A | 5/1978 | König et al. |
| 4,248,930 | A | 2/1981 | Haas et al. |
| 4,260,530 | A | 4/1981 | Reischl et al. |
| 4,263,408 | A | 4/1981 | Meyborg et al. |
| 5,420,170 | A * | 5/1995 | Lutter ................ C08G 18/4804 252/182.24 |
| 2004/0044093 | A1 | 3/2004 | Yu |
| 2005/0027026 | A1 | 2/2005 | Kinoshita |
| 2006/0084710 | A1 | 4/2006 | Meyer-Ahrens et al. |
| 2011/0091689 | A1 | 4/2011 | Horio et al. |
| 2011/0166244 | A1* | 7/2011 | Mortelmans ....... C08G 18/4072 521/137 |
| 2011/0263741 | A1* | 10/2011 | Tu ...................... C08G 18/3275 521/156 |

FOREIGN PATENT DOCUMENTS

| | | |
|---|---|---|
| CA | 1337448 C | 10/1995 |
| DE | 1 694 142 A1 | 10/1970 |
| DE | 1 694 215 A1 | 4/1971 |
| DE | 1 720 768 A1 | 7/1971 |
| EP | 0 000 389 A1 | 1/1979 |
| EP | 0 007 502 A1 | 2/1980 |
| EP | 355000 A1 | 2/1990 |
| GB | 1195822 A | 6/1970 |
| GB | 1211405 A | 11/1970 |
| GB | 1233251 A | 5/1971 |
| GB | 2038739 A | 7/1980 |
| JP | H11310624 A | 11/1999 |
| WO | WO-03046041 A1 | 6/2003 |
| WO | WO-2008079614 A1 | 7/2008 |
| WO | WO-2009157450 A1 | 12/2009 |

OTHER PUBLICATIONS

International Search Report for PCT/EP2013/061398 mailed Sep. 5, 2013.

* cited by examiner

*Primary Examiner* — John Cooney
(74) *Attorney, Agent, or Firm* — K&L Gates LLP

(57) ABSTRACT

The present invention provides a process for the production of a viscoelastic flexible polyurethane foam. The invention further relates to a viscoelastic flexible polyurethane foam slab or viscoelastic flexible polyurethane foam molding with particularly low emission values and pH values as close as possible to neutral, produced by the process according to the invention, and to the use of these foams.

15 Claims, No Drawings

PROCESS FOR THE PRODUCTION OF VISCOELASTIC POLYURETHANE FOAM

CROSS-REFERENCE TO RELATED APPLICATIONS

This application is a national stage application (under 35 U.S.C. §371) of PCT/EP2013/061398, filed Jun. 3, 2013, which claims benefit of Italian Application No. RM2012A000259, filed Jun. 6, 2012, both of which are incorporated herein by reference in their entirety.

The present invention provides a process for the production of a viscoelastic flexible polyurethane foam. The invention further relates to a viscoelastic flexible polyurethane foam slab or viscoelastic flexible polyurethane foam moulding with particularly low emission values and pH values as close as possible to neutral, produced by the process according to the invention, and to the use of these foams.

Viscoelastic foams are distinguished by a slow, gradual recovery of shape following compression. Such materials are well known in the state of the art and are very highly valued for their energy-absorbing properties. Viscoelastic foam materials are found in a large number of fields of application as upholstery (e.g. in cushions, seat covers, mattresses, etc.), as sound-absorbing and/or vibration-absorbing materials, or else as crash protection.

Polyurethane foams are certainly the most important of the viscoelastic foam materials. The reason for this is on the one hand that the physical properties of the polyurethane foam to be produced can be adjusted very precisely through the choice, the usage and way of producing of polyol or isocyanate components (and any other auxiliary substances) used, but also on the other hand that "in situ" production (sometimes on the spot) makes it possible to produce foam materials of almost any, very complex shape and structure.

Two or more liquid streams are usually combined together in the preparation of polyurethanes. The mixing of these liquid streams initiates the polymerization and in some cases the foaming of the polymerizing material. Polymerization and moulding often take place in one step, typically by moulding or spraying the reaction mixture while still in the liquid state. In addition, polyurethanes are often produced in the form of slabs, which are then cut to the desired shape.

In the majority of cases the above-mentioned liquid streams are on the one hand a polyfunctional organic isocyanate component (also often referred to as "component B") and on the other hand polyfunctional monomers or resins which have an appropriate reactivity towards isocyanates and may contain auxiliary substances as well. This mixture, frequently referred to as "component A", typically comprises predominantly one or more polyol components.

Now, to produce a polyurethane foam of a specific composition, the above-described liquid streams are appropriately proportioned prior to mixing. Foaming is normally achieved by adding water to component A, which reacts with the polyisocyanate of component B to form an amine and release $CO_2$, the latter in turn acting as a gaseous blowing agent. Alternatively or additionally to the use of water, it is also common to use volatile inert organic compounds or inert gases.

The majority of conventional polyurethane foams are block copolymers having spatially separated regions of different phases with high and low glass transition temperatures ($T_G$). The glass transition temperature separates the brittle energy-elastic region (or glass region) below it from the flexible entropy-elastic region (or rubber-like region) above it. These high and low glass transition temperatures of different phases within the polymer normally limit the temperature range over which said material can be used. The DMA (dynamic mechanical analysis) spectra of such materials are usually distinguished by a relatively flat region (modulus plateau) between the different glass transitions.

The phase of low glass transition temperature in these materials is usually (although not always) derived from a "block" of low glass transition temperature which is preformed and only then subjected to polymerization. The phase of high glass transition temperature, on the other hand, is normally formed only during polymerization, due to the formation of the urethane units which then takes place. The block of low glass transition temperature (also often referred to as "flexible block") is usually derived from a liquid or from an oligomeric resin of low melting point containing a large number of groups reactive towards isocyanate units. Polyether and polyester polyols are examples of such oligomeric resins.

In conventional polyurethanes the rigid phases (high glass transition temperature) and flexible phases (low glass transition temperature) arrange themselves together during polymerization and then separate spontaneously from one another to form morphologically different phases within the "bulk polymer". Accordingly, such materials are also called "phase-separated" materials.

To an extent, viscoelastic polyurethanes represent a special case in this context, i.e. they are materials in which the above-described phase separation only occurs incompletely or does not occur at all.

There is a distinction to be made between such a "structural viscoelasticity" in the case of flexible polyurethane foams with (predominantly) open cells and a viscoelasticity that is attributable to a pneumatic effect. In the latter case the foam material contains almost closed cells, i.e. cells with only a small opening. Following compression, the air only flows back in slowly due to the small size of the openings, resulting in a retarded recovery of shape.

Especially when used in the furniture industry, viscoelastic flexible polyurethane foams must meet particularly exacting ecological and sanitary requirements.

Reduction of the emissions of volatile organic compounds (VOC) from viscoelastic flexible polyurethane foams is normally achieved by using reactive catalysts which are incorporated into the polyurethane matrix through the presence of NCO-reactive groups.

Viscoelastic flexible polyurethane foams are normally produced using amine catalysts, so the resulting flexible polyurethane foams are more likely to have basic properties. US-A 2005/0027026 discloses a method of adjusting the basicity of viscoelastic flexible polyurethane foams by adding acidic constituents to the polyol formulation. However, the addition of acidic constituents has an adverse effect on the reactivity of the components and the polymerization kinetics.

WO-A 2008/079614 discloses the production of polyurethane foams by reacting a liquid polyisocyanate with a polyol mixture in the presence of urea and an autocatalytic polyol as co-catalyst for reducing the emissions of volatile amines. WO-A 2008/079614 does not disclose the production of viscoelastic flexible polyurethane foams in the presence of a reactive catalyst and urea.

JP-A 11-310624 discloses the use of urea as catalyst in the reaction of polyisocyanate with polyols. The purpose of the urea is to reduce the required amount of expensive PTMG (polyoxytetramethylene glycol) and replace it with the more readily available PPG (polyoxyethylene polyoxypropylene polyol), but still produce foams with the desired properties.

The production of viscoelastic flexible polyurethane foams in the presence of a reactive catalyst and urea is not disclosed.

WO-A 2009/157450 discloses flexible polyurethane foams with improved flame retardant properties, these being achieved by dispersing urea, urea condensation products and/or their salts in the formulation. The production of viscoelastic flexible polyurethane foams in the presence of a reactive catalyst and urea is not disclosed.

WO-A 03/046041 discloses viscoelastic polyurethanes based on a system containing monomeric polyisocyanate compositions, a polyol mixture containing ethylene oxide-rich polyether polyols and propylene oxide-rich polyether polyols, and a reactive catalyst system. WO-A 03/046041 does not disclose the production of viscoelastic flexible polyurethane foams in the presence of a reactive catalyst and urea.

There is still no known process for the production of viscoelastic flexible polyurethane foams which produces flexible polyurethane foams with both low emissions of volatile organic compounds (VOC) and pH values as close as possible to neutral.

The object of the present invention was therefore to develop a process for the production of viscoelastic flexible polyurethane foams which produces viscoelastic flexible polyurethane foams having both very low emissions of volatile organic compounds (low VOC), and a pH as close as possible to neutral, in the range from 4.5 to 7.5, of the aqueous phase of the flexible polyurethane foam.

This object is surprisingly achieved by a process for the production of viscoelastic flexible polyurethane foams which are obtainable by reacting
component A:
A1 40 to 90 parts by weight of at least one polyether polyol with a functionality of 2 to 6, preferably of 3, an oxyethylene content of >60 wt. %, preferably of >70 wt. %, more than 50 mol % of primary OH groups, preferably 75 to 85 mol % of primary OH groups, and a hydroxyl number (OH number) of ≥10 mg KOH/g to ≤112 mg KOH/g, preferably of ≥30 mg KOH/g to ≤50 mg KOH/g;
A2 0 to 40 parts by weight of at least one polyether polyol with a functionality of 2 to 6, preferably of 2, an oxyethylene content of 0 to 30 wt. %, preferably of 0 to 10 wt. %, particularly preferably free of oxyethylene units, less than 50 mol % of primary OH groups, preferably less than 10 mol % of primary OH groups, and an OH number of ≥8 mg KOH/g to ≤112 mg KOH/g,
A3 0 to 40 parts by weight of at least one polyether polyol with a functionality of 2 to 6, an oxyethylene content of 0 to 50 wt. %, more than 50 mol % of primary OH groups and an OH number≥8 mg KOH/g to ≤112 mg KOH/g
A4 0 to 30 parts by weight of at least one polyether polyol with a functionality of 2 to 6, an oxyethylene content of 0 to 30 wt. %, less than 50 mol % of primary OH groups and an OH number≥112 mg KOH/g
A5 0 to 30 parts by weight of at least one filler-containing polyether polyol (A5.1), wherein the filler is a reaction product of a di- or poly-isocyanate with a compound containing isocyanate-reactive hydrogen atoms and having a molecular weight of from 400 to 18,000 (component A5.2),
or a polymeric polyol (A5.3), which contains solid polymers produced by the free radical polymerisation of suitable monomers such as styrene and acrylonitrile, in a base polyol (A5.2),
the parts by weight of components A1 to A5 adding up to 100;
A6 0.5 to 25 parts by weight, preferably 2 to 5 parts by weight (based on the sum of the parts by weight of components A1 to A5), of water and/or physical blowing agents;
A7 0.5 to 5.0 parts by weight, preferably 0.8 to 2.0 parts by weight (based on the sum of the parts by weight of components A1 to A5), of urea;
A8 0.05 to 30 parts by weight, preferably 0.2 to 4 parts by weight (based on the sum of the parts by weight of components A1 to A5), of auxiliary substances and additives such as
a) catalysts,
b) surface-active additives,
c) pigments or flame retardants;
A9 0 to 10 parts by weight, preferably 0 to 5 parts by weight (based on the sum of the parts by weight of components A1 to A5), of compounds containing isocyanate-reactive hydrogen atoms with a molecular weight of 62 to 399, with component B comprising diisocyanates, polyisocyanates, mixtures of diisocyanates and/or polyisocyanates, mixture of isomers or prepolymers, the production taking place at an index of 50 to 150, preferably of 60 to 105 and particularly preferably of 65 to 90, and all the parts by weight of components A1 to A9 in the present patent application being standardized so that the sum of the parts by weight of A1+A2+A3+A4+A5 in the composition is 100.

The production of foams on the basis of isocyanate is known as such and described, for example, in DE-A 1 694 142, DE-A 1 694 215 and DE-A 1 720 768 and also in the Kunststoff-Handbuch Volume VII, *Polyurethane*, edited by Vieweg and Höchtlein, Carl Hanser Verlag Munich 1966, and also in the new edition of this book, edited by G. Oertel, Carl Hanser Verlag Munich, Vienna 1993.

For the production of the foams on the basis of isocyanate, the components described in more detail in the following may be employed.

To specify polyether polyols, various characteristics have become established in the prior art:

The functionality of the polyether polyols is determined by the functionality of the starter compounds used.

The hydroxyl or OH number according to DIN 53240, which is a measure of the content of hydroxyl groups stated in mg of KOH/g.

When epoxides in which the ring opening causes the formation of different (i.e., primary or secondary) hydroxyl groups are used, on the one hand, the proportion of the respective epoxides in the polyether polyol is stated, and on the other hand, the proportion of primary or secondary hydroxyl groups based on the total number of hydroxyl groups present in the polyether polyol is stated.

The molecular weight ($M_n$ or $M_w$), which is a measure of the length of the polyalkylene chains of the polyether polyols.

The above mentioned quantities can be related to one another through the following equation: $56{,}100 = \text{OH number} \cdot (M_w/\text{hydroxyl functionality})$.

Component A1 Component A1 contains 40 to 90 parts by weight of at least one polyether polyol with a functionality of 2 to 6, preferably of 3, an oxyethylene content of >60 wt. %, preferably of >70 wt. %, more than 50 mol % of primary OH groups, preferably 75 to 85 mol % of primary OH groups, and a hydroxyl number of ≥10 mg KOH/g to ≤112 mg KOH/g, preferably of ≥30 mg KOH/g to ≤50 mg KOH/g.

Polyether polyols of component A1 are alkylene oxide addition products of starter compounds with Zerewitinoff-active hydrogen atoms, i.e. polyether polyols with a hydroxyl number according to DIN 53240 of ≥10 mg KOH/g to ≤112 mg KOH/g, preferably of ≥30 mg KOH/g to ≤50 mg KOH/g.

Starter compounds with Zerewitinoff-active hydrogen atoms which are used for the polyether polyols have functionalities of 2 to 6, preferably of 3, and are hydroxy-functional. Examples of hydroxy-functional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene, and condensation products of formaldehyde and phenol or melamine or urea which contain methylol groups. Preferably, glycerol and/or trimethylolpropane are used as starter compounds.

Examples of suitable alkylene oxides are ethylene oxide, propylene oxide, 1,2-butylene-oxide or 2,3-butylene oxide and styrene oxide. Preferably, propylene oxide and ethylene oxide are introduced into the reaction mixture individually, in a mixture or successively. If the alkylene oxides are metered in successively, the resulting products contain polyether chains with block structures. Products with ethylene oxide blocks are characterized e.g. by increased concentrations of primary end groups, which impart an advantageous isocyanate reactivity to the systems. Preferably, component A1 has an oxyethylene content of >60 wt. %, preferably of >70 wt. %, and more than 50 mol % of primary OH groups, preferably 75 to 85 mol % of primary OH groups.

Component A2

Component A2 contains 0 to 40 parts by weight of at least one polyether polyol with a functionality of 2 to 6, preferably of 2, an oxyethylene content of 0 to 30 wt. %, preferably of 0 to 10 wt. %, particularly preferably free of oxyethylene units, less than 50 mol % of primary OH groups, preferably less than 10 mol % of primary OH groups, and an OH number of ≥8 mg KOH/g to ≤112 mg KOH/g.

Polyether polyols of component A2 are alkylene oxide addition products of starter compounds with Zerewitinoff-active hydrogen atoms, i.e. polyether polyols with a hydroxyl number according to DIN 53240 of ≥8 mg KOH/g to ≤112 mg KOH/g.

Starter compounds with Zerewitinoff-active hydrogen atoms which are used for the polyether polyols have functionalities of 2 to 6, preferably of 2, and are hydroxy-functional. Examples of hydroxy-functional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene, and condensation products of formaldehyde and phenol or melamine or urea which contain methylol groups. Preferably, propylene glycol is used as starter compounds.

Examples of suitable alkylene oxides are ethylene oxide, propylene oxide, 1,2-butylene-oxide or 2,3-butylene oxide and styrene oxide. Preferably, propylene oxide and ethylene oxide are introduced into the reaction mixture individually, in a mixture or successively. If the alkylene oxides are metered in successively, the resulting products contain polyether chains with block structures. Products with ethylene oxide blocks are characterized e.g. by increased concentrations of primary end groups, which impart an advantageous isocyanate reactivity to the systems. Preferably, component A2 has an oxyethylene content of 0 to 30 wt. %, preferably of 0 to 10 wt. %, particularly preferably free of oxyethylene units, and less than 50 mol % of primary OH groups, preferably less than 10 mol % of primary OH groups.

Component A3

Component A3 contains 0 to 40 parts by weight of at least one polyether polyol with a functionality of 2 to 6, preferably of 3, an oxyethylene content of 0 to 50 wt. %, more than 50 mol % of primary OH groups and an OH number ≥8 mg KOH/g to ≤112 mg KOH/g Polyether polyols of component A3 are alkylene oxide addition products of starter compounds with Zerewitinoff-active hydrogen atoms, i.e. polyether polyols with a hydroxyl number according to DIN 53240 of ≥8 mg KOH/g to ≤112 mg KOH/g.

Starter compounds with Zerewitinoff-active hydrogen atoms which are used for the polyether polyols have functionalities of 2 to 6, preferably of 3, and are hydroxy-functional. Examples of hydroxy-functional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene, and condensation products of formaldehyde and phenol or melamine or urea which contain methylol groups. Preferably, glycerol and/or trimethylolpropane are used as starter compounds.

Examples of suitable alkylene oxides are ethylene oxide, propylene oxide, 1,2-butylene-oxide or 2,3-butylene oxide and styrene oxide. Preferably, propylene oxide and ethylene oxide are introduced into the reaction mixture individually, in a mixture or successively. If the alkylene oxides are metered in successively, the resulting products contain polyether chains with block structures. Products with ethylene oxide blocks are characterized e.g. by increased concentrations of primary end groups, which impart an advantageous isocyanate reactivity to the systems. Preferably, component A3 has an oxyethylene content of 0 to 50 wt. %, preferably of 10 to 30 wt. %, and more than 50 mol % of primary OH groups, preferably 80 to 90 mol % of primary OH groups.

Component A4

Component A4 contains 0 to 30 parts by weight of at least one polyether polyol with a functionality of 2 to 6, preferably of 3, an oxyethylene content of 0 to 30 wt. %, preferably of 0 to 10 wt. %, particularly preferably free of oxyethylene units, less than 50 mol % of primary OH groups and an OH number ≥112 mg KOH/g Polyether polyols of component A4 are alkylene oxide addition products of starter compounds with Zerewitinoff-active hydrogen atoms, i.e. polyether polyols with a hydroxyl number according to DIN 53240 ≥112 mg KOH/g.

Starter compounds with Zerewitinoff-active hydrogen atoms which are used for the polyether polyols have functionalities of 2 to 6, preferably of 3, and are hydroxy-functional. Examples of hydroxy-functional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene, and condensation products of formaldehyde and phenol or melamine or urea which contain methylol groups. Preferably, glycerol and/or trimethylolpropane are used as starter compounds.

Examples of suitable alkylene oxides are ethylene oxide, propylene oxide, 1,2-butylene-oxide or 2,3-butylene oxide and styrene oxide. Preferably, propylene oxide and ethylene oxide are introduced into the reaction mixture individually, in a mixture or successively. If the alkylene oxides are metered in successively, the resulting products contain polyether chains with block structures. Products with ethylene oxide blocks are characterized e.g. by increased concentrations of primary end groups, which impart an advantageous isocyanate reactivity to the systems. Preferably, component A4 has an oxyethylene content of 0 to 30 wt. %, preferably of 0 to 10 wt. %, particularly preferably free of oxyethylene units, and less than 50 mol % of primary OH groups, preferably less than 10 mol % of primary OH groups.

Component A5

Components according to component A5 are filler-containing polyether polyols (A5.1), wherein the filler is a reaction product of a di- or poly-isocyanate with a compound containing isocyanate-reactive hydrogen atoms and having a molecular weight of from 400 to 18,000 (component A5.2).

For the process according to the invention, the filler-containing polyether polyols according to component A5.1 have a filler structure of A5.1.1 polyurea dispersions obtained by reaction of diamines and diisocyanates in the presence of the polyol component A5.2 (PHD dispersions)

and/or

A5.1.2 dispersions containing urethane groups, obtained by reaction of alkanolamines and diisocyanates in the polyol component A5.2 (PIPA polyols).

The filler-containing polyether polyols according to component A5.1.1 (PHD dispersion) are prepared, for example, by in situ polymerisation of an isocyanate or isocyanate mixture with a diamine and/or hydrazine in a polyol according to component A5.2, preferably in a polyether polyol. The PHD dispersion is preferably prepared by reaction of an isocyanate mixture comprising from 75 to 85 wt. % 2,4-toluene diisocyanate (2,4-TDI) and from 15 to 25 wt. % 2,6-toluene diisocyanate (2,6-TDI) with a diamine and/or hydrazine in a polyether polyol, preferably in a polyether polyol prepared by alkoxylation of a trifunctional starter (such as, for example, glycerol and/or trimethylolpropane). Processes for the preparation of PHD dispersions are described, for example, in U.S. Pat. No. 4,089,835 and U.S. Pat. No. 4,260,530.

The filler-containing polyether polyols according to component A5.1.2 are preferably PIPA (polyisocyanate polyaddition with alkanolamines)-modified polyether polyols, wherein the polyether polyol has a functionality of from 2.5 to 4 and a molecular weight of from 500 to 18,000.

Starting components according to component A5.2 are compounds with at least two isocyanate-reactive hydrogen atoms having a molecular weight of generally from 400 to 18,000. In addition to compounds containing amino groups, thio groups or carboxyl groups, these are preferably to be understood as being compounds containing hydroxyl groups, in particular from 2 to 8 hydroxyl groups, especially those having a molecular weight of from 1000 to 7000, preferably from 2000 to 7000, for example polyethers and polyesters containing at least 2, generally from 2 to 8, but preferably from 2 to 6, hydroxyl groups, as well as polycarbonates and polyester amides, as are known per se for the preparation of homogeneous and cellular polyurethanes and as are described, for example, in EP-A 0 007 502, pages 8-15. Preference is given according to the invention to polyether polyols containing at least two hydroxyl groups. The polyether polyols are preferably prepared by addition of alkylene oxides (such as, for example, ethylene oxide, propylene oxide and butylene oxide or mixtures thereof) to starters such as ethylene glycol, propylene glycol, glycerol, trimethylolpropane, pentaerythritol, sorbitol, mannitol and/or sucrose, so that a functionality of from 2 to 8, preferably from 2.5 to 6, particularly preferably from 2.5 to 4, can be established.

Component A5 can also contain as component A5.3 filled polyether polyols having a filler structure comprising dispersions which are obtained by grafting olefinically unsaturated monomers (for example styrene and/or acrylonitrile) to a polyether polyol (such as, for example, a polyether polyol according to component A5.2) (SAN polyols), these being used in amounts such that the filler content, based on polyol component A5 containing A5.1 and A5.2, is up to 5 wt. %, preferably up to 2 wt. % filler (resulting from component A5.3).

In one embodiment there are used as component A5 components A5.1 and A5.2 in a weight ratio of A5.1:A5.2=100:0 to 20:80, particularly preferably in a weight ratio of A5.1:A5.2=100:0 to 60:40. Most preferably, only component A5.1 is used as component A (that is to say starting components according to component A5.2 are most preferably not used in the preparation process).

In another embodiment there are used as component A5 component A5.3.

In another embodiment there are used as component A5 component A5.1 and A5.3 in a weight ratio of A5.1:A5.3=99:1 to 1:99 preferably in a weight ratio of A5.1:A5.3=50:50 to 1:99.

The filler content, based on the polyol component A5 containing A5.1, optionally A5.2, and/or A5.3 is preferably from 0 to 30 wt. %, particularly preferably from 5 to 20 wt.

Component A6

The substances used as component A6 are water and/or physical blowing agents. Examples of physical blowing agents used are carbon dioxide and/or readily volatile organic substances.

Component A7

The substance used as component A7 is urea in amounts of 0.5 to 5.0 parts by weight, preferably of 0.8 to 2.0 parts by weight (based on the sum of the parts by weight of components A1 and A9). The urea is preferably used as a solution in water containing e.g. 20-50 wt. % of urea.

Component A8

The substances used as component A8 are auxiliary substances and additives such as a) catalysts (activators),
b) surface-active additives (surfactants) like emulsifiers and foam stabilizers, especially those with low emissions, e.g. products of the Tegostab® LF series,
c) additives like reaction retarders (e.g. acid-reacting substances such as hydrochloric acid or organic acid halides), cell regulators (e.g. paraffins or fatty alcohols or dimethylpolysiloxanes), pigments, dyestuffs, flame retardants (e.g. tricresyl phosphate), ageing and weathering stabilizers, plasticizers, fungistatic and bacteriostatic substances, fillers (e.g. barium sulfate, kieselguhr, carbon black or whiting) and release agents.

These auxiliary substances and additives that may be used concomitantly are described e.g. in EP-A 0 000 389, pages 18-21. Further examples of auxiliary substances and additives that may be used concomitantly according to the invention, and details of their method of use and mode of action, are described e.g. on pages 104-127 of Kunststoff-Handbuch, volume VII, edited by G. Oertel, Carl-Hanser-Verlag, Munich, 3rd edition, 1993.

The substances used according to the invention as catalysts a) are so-called reactive catalysts such as α) urea derivatives and/or β) amines and/or amino ethers which each contain one functional group that reacts chemically with the isocyanate. Preferably, the functional group is a hydroxyl group or a primary or secondary amino group. These particularly preferred catalysts have the advantage of a greatly reduced migration and emission behaviour.

The following may be mentioned as examples of particularly preferred catalysts: (3-dimethylaminopropyl)urea, (3-dimethylaminopropylamine)urea, 2-(2-dimethylaminoethoxyl)ethanol, N,N-bis(3-dimethylaminopropyl)-N-isopropanolamine, N,N,N-trimethyl-N-hydroxyethyl-bisaminoethyl ether and 3-dimethylaminopropylamine.

Component A9

The substances which may be used as component A9 are compounds with at least two isocyanate-reactive hydrogen atoms and with a molecular weight from 62 to 399. These are to be understood as meaning compounds having hydroxyl groups and/or amino groups and/or thiol groups and/or carboxyl groups, preferably compounds having hydroxyl groups and/or amino groups, which act as chain extenders or crosslinking agents. These compounds normally have 2 to 8, preferably 2 to 4, isocyanate-reactive hydrogen atoms. Examples of substances which can be used as component A9 are ethanolamine, diethanolamine, triethanolamine, sorbitol, glycerol, ethylene glycol and/or propylene glycol. Further examples of compounds of component A9 are described in EP-A 0 007 502, pages 16-17.

Component B

The substances used as component B are aliphatic, cycloaliphatic, araliphatic, aromatic and heterocyclic polyisocyanates such as those described by W. Siefken in Justus Liebigs Annalen der Chemie, 562, pages 75 to 136, e.g. those of formula (I):

$$Q(NCO)_n \qquad (I)$$

in which n=2-4, preferably 2-3, and

Q is an aliphatic hydrocarbon radical with 2-18 C atoms, preferably 6-10 C atoms, a cycloaliphatic hydrocarbon radical with 4-15 C atoms, preferably 6-13 C atoms, or an araliphatic hydrocarbon radical with 7-15 C atoms, preferably 7-13 C atoms.

Examples of polyisocyanates are those described in EP-A 0 007 502, pages 7-8. Preferred polyisocyanates are normally those which are readily available in industry, e.g. 2,4- and 2,6-toluylene diisocyanate and any desired mixtures of these isomers ("TDI"), polyphenylpolymethylene polyisocyanates such as those prepared by aniline-formaldehyde condensation and subsequent phosgenation ("crude MDI"), and polyisocyanates containing carbodiimide groups, urethane groups, allophanate groups, isocyanurate groups, urea groups or biuret groups ("modified polyisocyanates"), especially modified polyisocyanates derived from 2,4- and/or 2,6-toluylene diisocyanate or from 4,4'- and/or 2,4'-diphenylmethane diisocyanate. Preferably, the polyisocyanate used is at least one compound selected from the group comprising 2,4- and 2,6-toluylene diisocyanate, 4,4'-, 2,4'- and 2,2'-diphenylmethane diisocyanate and polyphenylpolymethylene polyisocyanate ("polynuclear MDI").

It has proved particularly advantageous to use MDI which has a monomer content of 75 to 86 wt. %. The proportion of the 2,4'-isomer of MDI in the whole of the MDI monomer content is preferably 8 to 45 wt. %, particularly preferably 25 to 40 wt. %.

It is also possible to use prepolymers of said polyisocyanates as component B. These are obtainable e.g. by the prepolymerization of said polyisocyanates with organic compounds having at least one hydroxyl group. Examples which may be mentioned are polyether or polyester polyols having one to four hydroxyl groups and molecular weights of 62 to 15000 g/mol. It is particularly preferable to use prepolymers which have been obtained by prepolymerization with the polyether polyols A1, A2 or A3 according to the invention.

In one particularly preferred embodiment, an MDI-based prepolymer is used which is the reaction product of MDI, containing 45.0 to 55.0 wt. % of 4,4'-MDI, 30 to 40 wt. % of 2,4'-MDI and 5.0 to 15.0 wt. % of polynuclear MDI, with a polyether polyol of component A1 described above. The proportion of MDI isomers in the prepolymer is 92.0 to 98.0 wt. %.

The index gives the percentage ratio of the amount of isocyanate actually used to the stoichiometric amount, i.e. the amount of isocyanate groups (NCO) calculated for conversion of the OH equivalents.

Index=[(amount of isocyanate used):(calculated amount of isocyanate)]·100

The viscoelastic flexible polyurethane foams are produced by reacting the reaction components by the one-stage process known per se, often using mechanical equipment, e.g. that described in EP-A 355 000. Details of processing equipment which is also considered according to the invention are described e.g. on pages 139 to 265 of Kunststoff-Handbuch, volume VII, edited by Vieweg and Höchtlen, Carl-Hanser-Verlag, Munich 1993.

The viscoelastic flexible polyurethane foams produced by the process according to the invention can be produced as either foam mouldings or foam slabs. Preferably, the viscoelastic flexible polyurethane foams according to the invention are produced as foam mouldings.

The invention therefore also provides the viscoelastic flexible polyurethane foams produced according to the invention, which can be in the form of flexible polyurethane foam slabs or, preferably, flexible polyurethane foam mouldings. The flexible polyurethane foams obtainable according to the invention are used e.g. in furniture upholstery, textile padding, mattresses, car seats, head supports, arm rests, sponges and structural elements.

The viscoelastic flexible polyurethane foams produced by the process according to the invention are distinguished by having volatile emissions of ≤0.50 mg/m³, preferably of ≤0.20 mg/m³ and very particularly preferably of ≤0.11 mg/m³, and a pH of 6.5 to 7.5, preferably of 6.6 to 7.4 and particularly preferably of 6.8 to 7.2.

EXAMPLES

The following materials and abbreviations are as follows:

polyol A1: Polyetherpolyol having a OH-number of 37 mg KOH/g, manufactured by addition of propylene oxide and ethylene oxide, having an ethylenoxide content of 71.1 mol-% and a content of primary OH-groups of 83 mol-%.

polyol A2: Polyetherpolyol having a OH-number of 56 mg KOH/g, manufactured by addition of propylene oxide.

Dabco® NE 1070: solution comprising [3-(dimethylamino)propyl]urea, Air Products, Hamburg, Germany.

Niax® Catalyst EF-867: reactive catalyst comprising water, bis-(N,N-dimethylaminethoxyethyl)isophorone dicarbamate and [3-(dimethylamino)propyl]urea, Momentive Performance Chemicals, Leverkusen, Germany.

Dabco® 33 LV: non-reactive catalyst—1,4-Diazabicyclo[2.2.2]octane (33 wt. %) in dipropylene glycol (67 wt. %), Air Products, Hamburg, Germany).

NMI: N-methylimidazole

Tegostab® B 8465: Polyether-siloxane-based foam stabilizer, Evonik Goldschmidt GmbH, Germany.

Tegostab® B 8409: Polyether-siloxane-based foam stabilizer, Evonik Goldschmidt GmbH, Germany.

Urea Tech: solid urea, technical grade, 46% nitrogen content.

MDI-prepolymer: prepolymer resulting from the reaction of MDI (48.4 wt.-% 4,4'-MDI, 36.9 wt.-% 2,4'-MDI and 11.4 wt.-% polynuclear MDI) and Polyetherpolyol A1; the content of MDI within the prepolymer is about 96.5 Gew.-%; NCO-content 31.8%, viscosity at 25° C. is 35 mPas.

OH-value was determined by DIN 53240.

The emission values VOC (volatile organic compounds) were determined according to the procedure to OEKO-TEX® STANDARD 100.

The pH-value was determined by UNI EN ISO 3170.

Manufacture of Moulded Polyurethane Foams

The viscoelastic moulded polyurethane foam has been manufactured by processing the starting components from Table 1 by means of moulded foaming under the conventional processing conditions for the production of moulded polyurethane foams using a standard High Pressure with 270 g/s of output. Solid urea (technical grade, 46% Nitrogen) is pre-dispersed in 1.8 pbw of water to obtain an urea solution (40% urea) before being dosed in the vessel. The remaining 1.7 pbw of water is additionally dosed to the polyol mixture so that in total 3.5 pbw of water are present in the complete formulation.

Table 1 shows the characteristic number for the processing (the amount of component B to be employed in relation to component A is obtained from this). The characteristic number (isocyanate index) indicates the percentage ratio of the amount of isocyanate actually employed to the stoichiometric, i.e. calculated, amount of isocyanate groups (NCO) for the reaction of the OH-equivalents.

Characteristic number=[(isocyanate amount employed):(calculated isocyanate amount)]·100    (I).

TABLE 1

Manufacture of moulded polyurethane foams

| | | Example 1 | Example 2 (comp.) | Example 3 (comp.) |
|---|---|---|---|---|
| starting components | polyol A1 [pbw] | 79.16 | 79.16 | 79.16 |
| | polyol A2 [pbw] | 14.84 | 14.84 | 14.84 |
| | Total water (A6) [pbw] | 3.5 | 3.5 | 3.5 |
| | Urea tech (A7) [pbw] | 1.2 | — | — |
| | Dabco ® NE 1070 (A8) [pbw] | 0.3 | 0.5 | — |
| | Niax ® Catalyst EF-867 (A8) [pbw] | — | 0.3 | — |
| | Dabco ® 33 LV (A8) [pbw] | — | — | 0.5 |
| | NMI (A8) [pbw] | — | — | 0.15 |
| | Tegostab ® B 8465 (A8) [pbw] | 0.8 | 0.8 | 0.8 |
| | Tegostab ® B 8409 (A8) [pbw] | 0.5 | 0.5 | 0.5 |
| | MDI-prepolymer [WR] (B) | 43 | 43 | 43 |
| | Characteristic number | 70 | 70 | 70 |
| | pH-value | 7 | 9.5 | 9.5 |
| | VOC [mg/m³] | 0.093 | 0.1-0.2 | >0.5 |

Abbreviations: comp. = comparative example; pbw = parts by weight; WR = weight ratio of component A to component B at the given characteristic number and related to 100 parts by weight of component A.

The inventive moulded Polyurethane foam (example 1) has a pH-value of pH=7 and a VOC value of 0.09 mg/m³, whereas the comparative example 2 (use of a reactive catalyst system, but no additional urea) only fulfils the criteria of low emission foams but fails to meet the requirement of the neutral pH-value. The foam manufactured with a conventional tertiary amine catalyst in absence of urea (comp. example 3) fails to meet both criteria.

The invention claimed is:

1. A process for the production of viscoelastic flexible polyurethane foams, the process comprising reacting
component A:
A1 40 to 90 parts by weight of at least one polyether polyol with a functionality of 2 to 6, an oxyethylene content of >60 wt. %, more than 50 mol % of primary OH groups and a hydroxyl number (OH number) of ≥10 mg KOH/g to ≤112 mg KOH/g;
A2 0 to 40 parts by weight of at least one polyether polyol with a functionality of 2 to 6, an oxyethylene content of 0 to 30 wt. %, less than 50 mol % of primary OH groups and an OH number of ≥8 mg KOH/g to ≤112 mg KOH/g,
A3 0 to 40 parts by weight of at least one polyether polyol with a functionality of 2 to 6, an oxyethylene content of 0 to 50 wt. %, more than 50 mol % of primary OH groups and an OH number≥8 mg KOH/g to ≤112 mg KOH/g
A4 0 to 30 parts by weight of at least one polyether polyol with a functionality of 2 to 6, an oxyethylene content of 0 to 30 wt. %, less than 50 mol % of primary OH groups and an OH number ≥112 mg KOH/g
A5 0 to 30 parts by weight of at least one filler-containing polyether polyol, wherein the filler is a reaction product of a di- or poly-isocyanate with a compound containing isocyanate-reactive hydrogen atoms and having a molecular weight of from 400 to 18,000,
or a polymeric polyol, which contains solid polymers produced by the free radical polymerization of monomers in a base polyol, the parts by weight of components A1 to A5 adding up to 100;
A6 0.5 to 25 parts by weight, based on the sum of the parts by weight of components A1 to A5, of water and/or physical blowing agents;
A7 0.5 to 5.0 parts by weight, based on the sum of the parts by weight of components A1 to A5, of urea;
A8 0.05 to 30 parts by weight, based on the sum of the parts by weight of components A1 to A5 of auxiliary substances or additives;
A9 0 to 10 parts by weight, based on the sum of the parts by weight of components A1 to A5, of compounds containing isocyanate-reactive hydrogen atoms with a molecular weight of 62 to 399;

with component B comprising diisocyanates, polyisocyanates, mixtures of diisocyanates and/or polyisocyanates, or mixture of isomers or prepolymers thereof;

the production taking place at an index of 50 to 150; and all the parts by weight of components A1 to A9 being standardized so that the sum of the parts by weight of A1+A2+A3+A4+A5 in the composition is 100.

2. The process according to claim 1, wherein component A8 is selected from:
 (a) catalysts,
 (b) surface-active additives, and
 (c) pigments or flame retardants.

3. The process according to claim 1, wherein component A1 has an oxyethylene content of >70 wt. % and component A2 has an oxyethylene content of 0 to 10 wt. %.

4. The process according to claim 2, wherein component A8 contains, as catalysts (a):
 i) urea derivatives and/or
 ii) amines and amino ethers which each contain one functional group that reacts chemically with the isocyanate.

5. The process according to claim 1, wherein the amount of component A7 is 0.8 to 2.0 parts by weight, based on the sum of the parts by weight of components A1 to A5.

6. The process according to claim 1, wherein component B is a prepolymer.

7. The process according to claim 6, wherein component A1 is used in a prepolymerization to obtain the prepolymer.

8. The process according to claim 6, wherein MDI is used in a prepolymerization to obtain the prepolymer.

9. The process according to claim 1, wherein the amount of component B is selected so that the index is in the range from 60 to 105.

10. A viscoelastic polyurethane foam prepared by a process according to claim 1.

11. The viscoelastic polyurethane foam according to claim 10 in the form of a flexible polyurethane molded foam or slab.

12. Textile padding comprising the viscoelastic polyurethane foam according to claim 10, wherein the textile padding is present in furniture upholstery, textile padding, mattresses, car seats, head supports, or arm rests.

13. A process for the production of viscoelastic flexible polyurethane foams, the process comprising reacting component A:

A1 40 to 90 parts by weight of at least one polyether polyol with a functionality of 2 to 6, an oxyethylene content of >70 wt. %, more than 50 mol % of primary OH groups and a hydroxyl number (OH number) of ≥10 mg KOH/g to ≤112 mg KOH/g;

A2 0 to 40 parts by weight of at least one polyether polyol with a functionality of 2 to 6, an oxyethylene content of 0 to 10 wt. %, less than 50 mol % of primary OH groups and an OH number of ≥8 mg KOH/g to ≤112 mg KOH/g, A3 0 to 40 parts by weight of at least one polyether polyol with a functionality of 2 to 6, an oxyethylene content of 0 to 50 wt. %, more than 50 mol % of primary OH groups and an OH number≥8 mg KOH/g to ≤112 mg KOH/g A4 0 to 30 parts by weight of at least one polyether polyol with a functionality of 2 to 6, an oxyethylene content of 0 to 30 wt. %, less than 50 mol % of primary OH groups and an OH number≥112 mg KOH/g A5 0 to 30 parts by weight of at least one filler-containing polyether polyol, wherein the filler is a reaction product of a di- or poly-isocyanate with a compound containing isocyanate-reactive hydrogen atoms and having a molecular weight of from 400 to 18,000, or a polymeric polyol, which contains solid polymers produced by the free radical polymerization of monomers in a base polyol, the parts by weight of components A1 to A5 adding up to 100;

A6 0.5 to 25 parts by weight, based on the sum of the parts by weight of components A1 to A5, of water and/or physical blowing agents;

A7 0.8 to 2.0 parts by weight, based on the sum of the parts by weight of components A1 to A5, of urea;

A8 0.05 to 30 parts by weight, based on the sum of the parts by weight of components A1 to A5 of auxiliary substances or additives;

A9 0 to 10 parts by weight, based on the sum of the parts by weight of components A1 to A5, of compounds containing isocyanate-reactive hydrogen atoms with a molecular weight of 62 to 399;

with component B comprising diisocyanates, polyisocyanates, mixtures of diisocyanates and/or polyisocyanates, or mixture of isomers or prepolymers thereof;

the production taking place at an index of 60 to 105; and all the parts by weight of components A1 to A9 being standardized so that the sum of the parts by weight of A1+A2+A3+A4+A5 in the composition is 100.

14. A viscoelastic polyurethane foam prepared by a process according to claim 13, the polyurethane foam in the form of a flexible polyurethane molded foam or slab.

15. Textile padding comprising the viscoelastic polyurethane foam according to claim 14, wherein the textile padding is present in furniture upholstery, textile padding, mattresses, car seats, head supports, or arm rests.

* * * * *